US007984505B2

(12) United States Patent
Read

(10) Patent No.: US 7,984,505 B2
(45) Date of Patent: Jul. 19, 2011

(54) REARRANGEMENT OF MEDIA CONTENT WHILE PRESERVING DIGITAL RIGHTS MANAGEMENT PROTECTION

(75) Inventor: Christopher J. Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1006 days.

(21) Appl. No.: 11/592,863

(22) Filed: Nov. 3, 2006

(65) Prior Publication Data

US 2008/0109366 A1 May 8, 2008

(51) Int. Cl.
*G06F 21/00* (2006.01)
(52) U.S. Cl. ........... 726/26; 726/27; 726/31; 726/32; 726/33
(58) Field of Classification Search .......... 713/155–157; 726/26–32
See application file for complete search history.

(56) References Cited

U.S. PATENT DOCUMENTS

| 6,631,359 | B1 * | 10/2003 | Braitberg et al. | 705/50 |
| 2002/0161996 | A1 | 10/2002 | Koved et al. | 713/150 |
| 2002/0196940 | A1 | 12/2002 | Isaacson et al. | 380/227 |
| 2002/0196941 | A1 | 12/2002 | Isaacson et al. | 380/231 |
| 2002/0198841 | A1 | 12/2002 | Isaacson et al. | 705/51 |
| 2004/0010602 | A1 | 1/2004 | Van Vleck et al. | 709/229 |
| 2004/0236697 | A1 * | 11/2004 | Nagao | 705/59 |
| 2005/0125221 | A1 * | 6/2005 | Brown et al. | 704/200.1 |
| 2005/0204019 | A1 | 9/2005 | Flynn et al. | 709/219 |
| 2005/0268346 | A1 | 12/2005 | Lee et al. | 726/27 |
| 2006/0059101 | A1 * | 3/2006 | Ebihara et al. | 705/59 |

FOREIGN PATENT DOCUMENTS

WO    WO 2005/119677 A1    12/2005

\* cited by examiner

*Primary Examiner* — Vivek Srivastava
*Assistant Examiner* — Helai Salehi
(74) *Attorney, Agent, or Firm* — Stuart H. Mayer, Esq; Karin L. Williams, Esq.; Mayer & Williams PC

(57) ABSTRACT

An arrangement for managing a media file having an associated DRM license is provided by enabling the copying of the media file stored on a source medium to a target medium only when both the source medium and the target medium are held in custody by a media server. The media server writes a copy of a media file and a copy of the associated DRM license from the source medium to the target medium. Upon confirmation that the copy of the DRM license was successfully written to the target medium, the DRM license and media file on the source medium are overwritten. The result is that the target medium contains both the media files and the DRM licenses which are locked to the target medium.

27 Claims, 6 Drawing Sheets

REARRANGEMENT OF MEDIA CONTENT WHILE PRESERVING DIGITAL RIGHTS MANAGEMENT PROTECTION

RELATED APPLICATION

This application is related to U.S. patent application Ser. No. 11/592,649 the disclosure of which is incorporated by reference. The related application is commonly assigned.

BACKGROUND

Digital rights management ("DRM") is seeing more widespread use to control access, use, and distribution of digital media content such as software, music, ring tones, video (e.g., television, music videos and movies), games and interactive entertainment, and other digital data. One of the reasons DRM was developed is that digital media content, unlike traditional analog media content, has the potential to be copied over and over without any loss of quality in subsequent copies. In addition, the costs to copy digital media content and distribute it over networks such as the Internet are very small compared with the costs to create the content. Peer-to-peer file sharing over the Internet has become very common as a result. In instances when the shared files include DRM-protected or copyrighted works, peer-to-peer sharing without an associated DRM license or copyright is generally considered unlawful in most parts of the world.

DRM typically enforces some restrictions on the duration of time or number of times a media file may be played on a device, or may limit the number of devices that may be used for playback. Some DRM methodologies, such as those currently used with digital versatile disc ("DVD") limit use of the media content to playback only without authorization or enablement for copies to be made. DRM is also being used with some media content sold on compact disc ("CD") as well. Whatever particular rights or limits are provided, DRM generally enables digital media content providers to protect and manage their investments in creating the content. Such protection and management is often viewed as being reasonably necessary to ensure that a wide variety of high quality media content continues to be available to consumers.

DRM-protection is also applied to downloadable media content such as music and videos that are sold by online electronic storefronts. The DRM license associated with such content generally restricts the number of devices (such as personal computers) that can play the media content. In addition, the DRM license often restricts the number of copies that may be written to a storage medium, for example, by being "burned" to an optical disc such as a CD or DVD.

Under most current DRM methodologies, when media content is copied to a storage medium such as a writable CD or DVD, the resulting copies are no longer DRM-protected. Users can make an unlimited number of copies of the media content from the storage medium. In addition, once DRM-protection is removed, users are also free to rip (i.e., convert) the media files on the storage medium to a compressed and unprotected format such as MP3 (Moving Pictures Expert Group Audio Layer 3) which makes it easy to improperly distribute copyrighted media over networks such as the Internet.

While current DRM methodologies are satisfactory in many applications, they do not cover all situations as effectively as possible. For example, a user may wish to rearrange the play order of DRM-protected media content that is written on a storage medium such an optical disc. That is, a certain group of songs stored on different discs may be desired to be on one specific disc so it can be played at an event such as a party or at a friend's house, etc. Under current DRM schemes, when the user transfers the songs to a new disc to create the desired play order, the DRM protection is removed, even in cases when the user would accept DRM limits placed on the copied media content. Accordingly, it would be desirable to enable a user to move and rearrange DRM-protected media content from storage medium to storage medium without losing the associated DRM protection.

SUMMARY

An arrangement for managing a media file (e.g., music, video, game, ring tone, software etc.) having an associated DRM license is provided by enabling the copying of the media file stored on a source medium to a target medium only when both the source medium and the target medium are held in custody by a media server. A DRM paradigm is implemented in which custody of the media file on the source medium is presumptive validation of the holder's continued right to use the media files and rearrange the playing order of the media files as desired.

In an illustrative example, such rearranging is accomplished using a media server such as a jukebox having two drives—a source drive and a target drive—to copy the media files from a source medium to a target medium so as to place the media files in the order selected by a user. The source medium contains DRM-protected media files having a particular play order. The DRM-protected media files are typically provided on an optical medium, such as a CD, which is sold on a retail basis by a media publisher. Alternatively, the DRM-protected digital media files are downloaded by a user from an online source, such as an online music store, and burned to the source medium.

The copying is performed when the source and target media are held in custody of the media server. The media server writes a copy of a media file and a copy of the associated DRM license from the source medium to the target medium. Upon confirmation that the copy of the DRM license was successfully written to the target medium, the media server overwrites the DRM license on the source medium. This process is repeated for other media files and associated DRM licenses according to the order selected by the user. Only after the DRM licenses are overwritten (which then disables use of the associated media files on the source medium) is the target medium released from custody of the media server. The result is that the target medium contains both the media files and the DRM licenses which are locked to the target medium.

In another illustrative example, media files from a plurality of source media are copied in a selected order to a plurality of target source media. In this way, a user can rearrange music files, for example, from two different source CDs (e.g., discs A and B) on to two different target CDs (e.g., discs C and D) in a selected play order. Once copied, the music files and associated DRM licenses are overwritten from discs A and B.

Advantageously, the user may use a target medium having the desired media content playing order with the DRM protection kept intact. However, as the original media files on the source medium are overwritten after being copied to the target medium, there is no proliferation of copies of the media files using the present arrangement. If the media content on the target medium is sold or transferred, then the right to use the media content and subsequently reorder and rearrange it is also sold or transferred.

The present arrangement strikes an advantageous balance between protecting content creators' rights and investment and providing consumers with an easy way to use DRM-protected media content. As the present DRM paradigm relies on custody of media content as an enabler of usage rights, the expectations of consumers—who traditionally equate possession of an object with the right to use it—are better satisfied. In addition, it is anticipated that consumers will be more willing to accept the present the DRM license paradigm because it operates transparently and makes it easy and convenient to rearrange or reorder media content on one or more storage media without breaking DRM rules.

DETAILED DESCRIPTION

Figure 1:
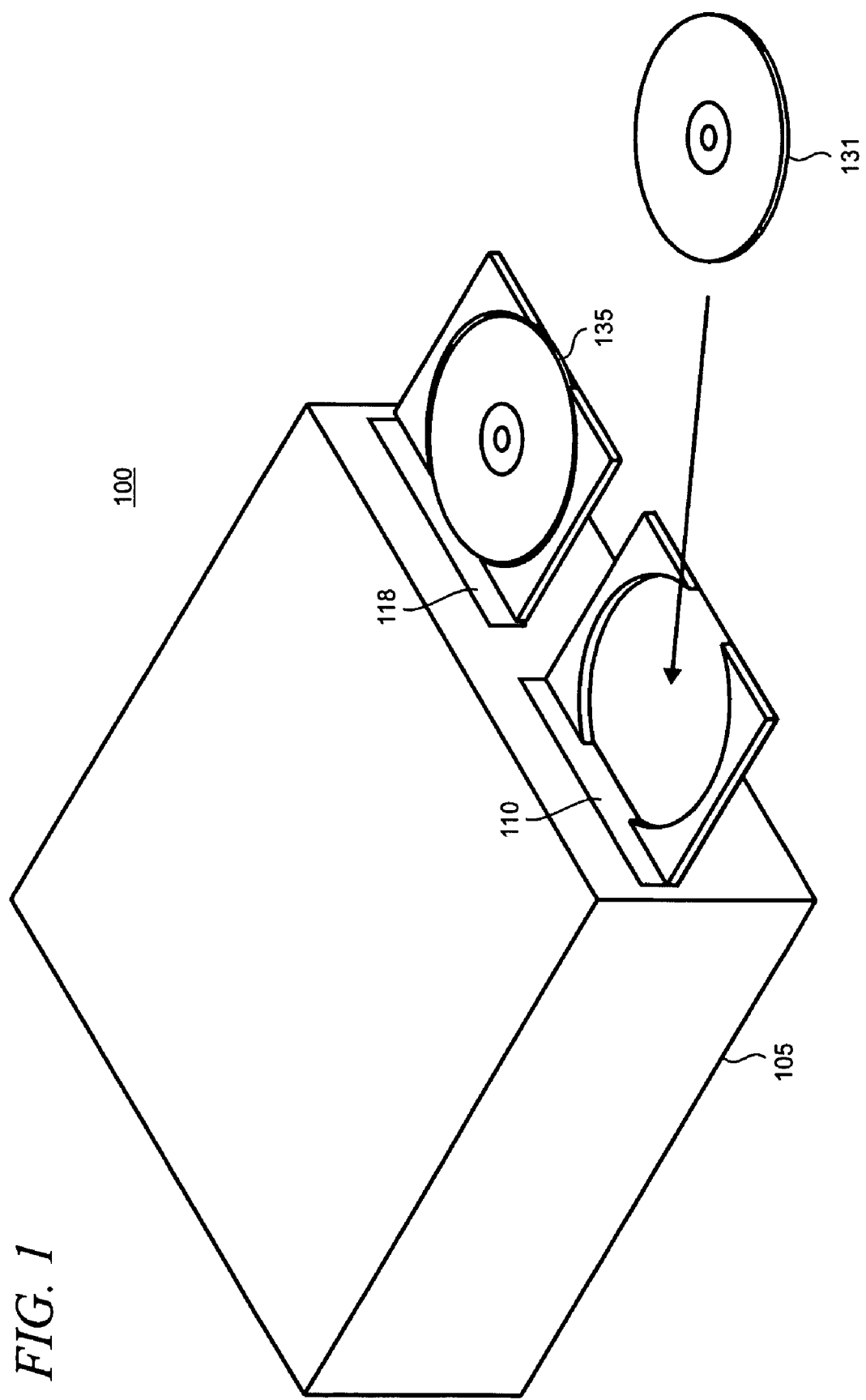
FIG. 1 is a pictorial view of an illustrative arrangement for enabling the reordering of media content using a dual drive media server.

FIG. 1 is a pictorial view of an illustrative arrangement 100 for enabling the reordering of media content using a dual drive media server such as a jukebox 105. Jukebox 105 includes a source drive 110 and a target drive 118 which are each arranged, in this illustrative example, as optical drives that can both read from, and write to, writable optical media. In alternative arrangements, the separate drives for reading and writing may also be used.

The jukebox 105 has custody of source medium 131 and target medium 135 which are placed in the trays (in their extended positions) of source and target drives 110 and 118, respectively, as shown. Media 131 and 135 are shown in FIG. 1 as implemented using an optical disc storage medium such as a CD or DVD. Media 131 and 135 are typically rewritable optical media such as CD-RW, DVD+RW, or DVD-RW. Source and target drives 110 and 118 are optionally arranged as hybrid-type optical drives in order to be capable of using both +RW and -RW rewritable DVD discs.

Custody of media content is a fundamental principle which underlies the present DRM licensing paradigm which grants rights to the holder of the media content. That is, under the paradigm, custody of media content is required to enable usage rights according to the DRM licenses that accompany the media content. Without custody, no rights under the DRM licenses are provided.

Figure 2:
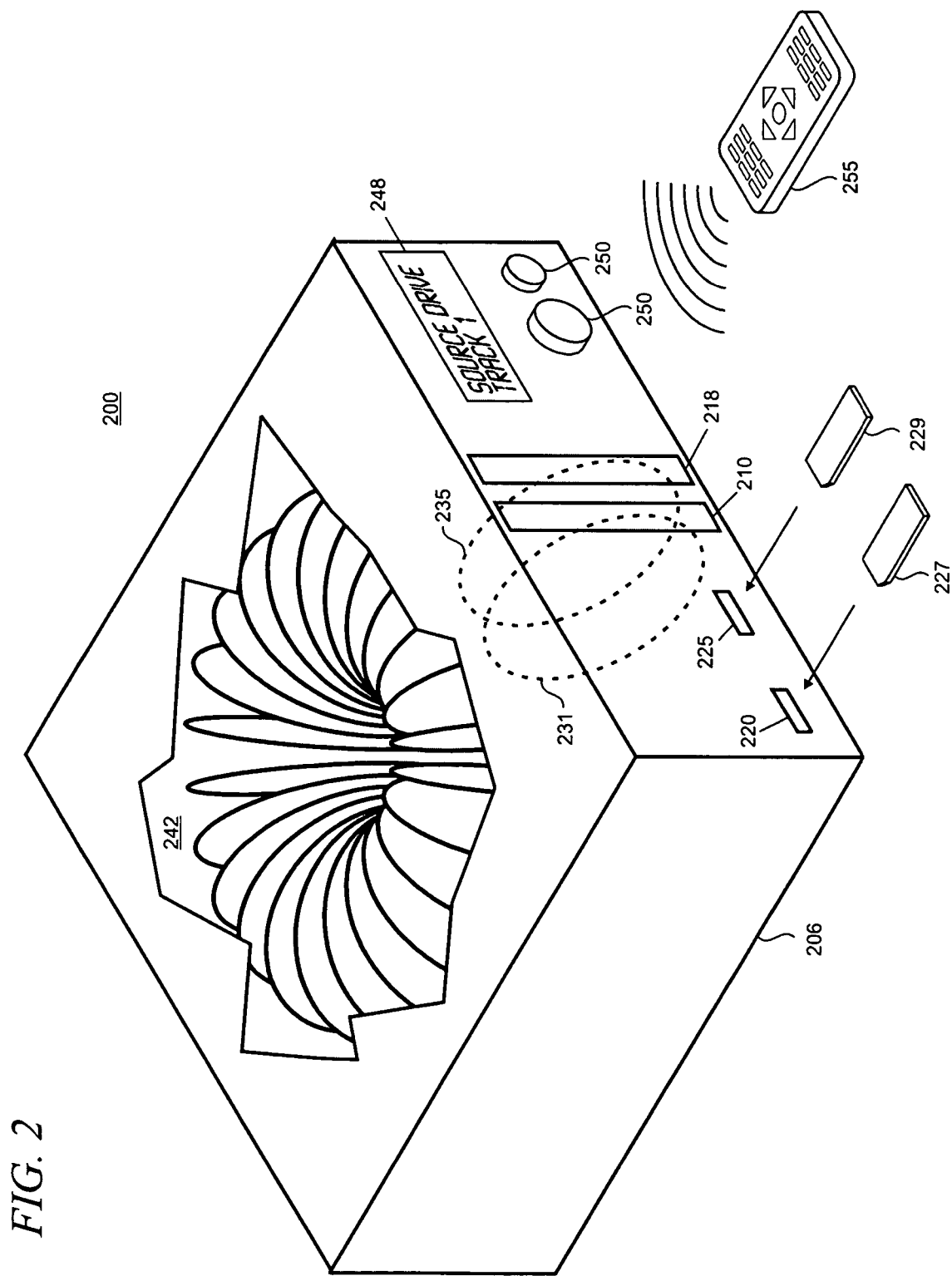
FIG. 2 is a pictorial view of an illustrative arrangement for enabling the reordering of media content using a media server configured with removable media readers, user interface and carousel storage.

FIG. 2 is a pictorial view of an illustrative arrangement 200 for enabling the reordering of media content using a media server such as jukebox 206. Jukebox 206 is configured to hold custody of a number of optical discs containing media content in a carousel arrangement 242 as shown in cutaway view in FIG. 2. Carousel 242 is utilized to provide bulk storage for the optical discs contained therein. In alternative arrangements, the optical discs are held in a linear arrangement.

Jukebox 206 includes a source drive 210 and target drive 218 which are configured with similar functionality as drives 110 and 118 shown in FIG. 1 and described in the accompanying text. Source and target drives 210 and 218 are arranged with a capability to access (i.e., load) optical discs from carousel 242 and then perform read/write operations to the loaded discs. Source and target media 231 and 235 (shown in phantom view in FIG. 2) are loaded into source drive 210 and target drive 218, respectively. Source and target media 231 and 235 are arranged in a similar manner as media 131 and 135 in FIG. 1.

Jukebox 206, in this illustrative example is further configured with dual removable media drives 220 and 225. Removable media drives 220 and 225 are configured to read from and write to removable media 227 and 229 which are typically selected from one or more of the variety of currently available flash memory cards such as Memory Stick, CompactFlash and SD (Secure Digital). Such flash memory cards are small but are capable of storing large amounts of digital media content, often in the multiple gigabyte range. Removable media 227 and 229 are used, in some applications as an alternative storage and distribution form to the optical storage media 231 and 235.

Jukebox 206 is optionally configured to hold custody of a number of optical discs containing media content in a carousel arrangement 242 as shown in cutaway view in FIG. 2. Carousel 242 is utilized to provide bulk storage for the optical discs contained therein that are readable and/or writable using a read/write optical drive (not shown).

Jukebox 206 includes a display 248 and input devices 250 (e.g., knobs, buttons, etc.) which function as a user interface to facilitate user input and control to the jukebox. A remote control device 255 may also be utilized to provide user control employing, for example, an infrared or radio frequency wireless communications path. The user interface enables a user to select media files from the source medium 231 or removable medium 227 that are copied to respective target media as well as the play order of the copied media files, as described in more detail below.

Figure 3:
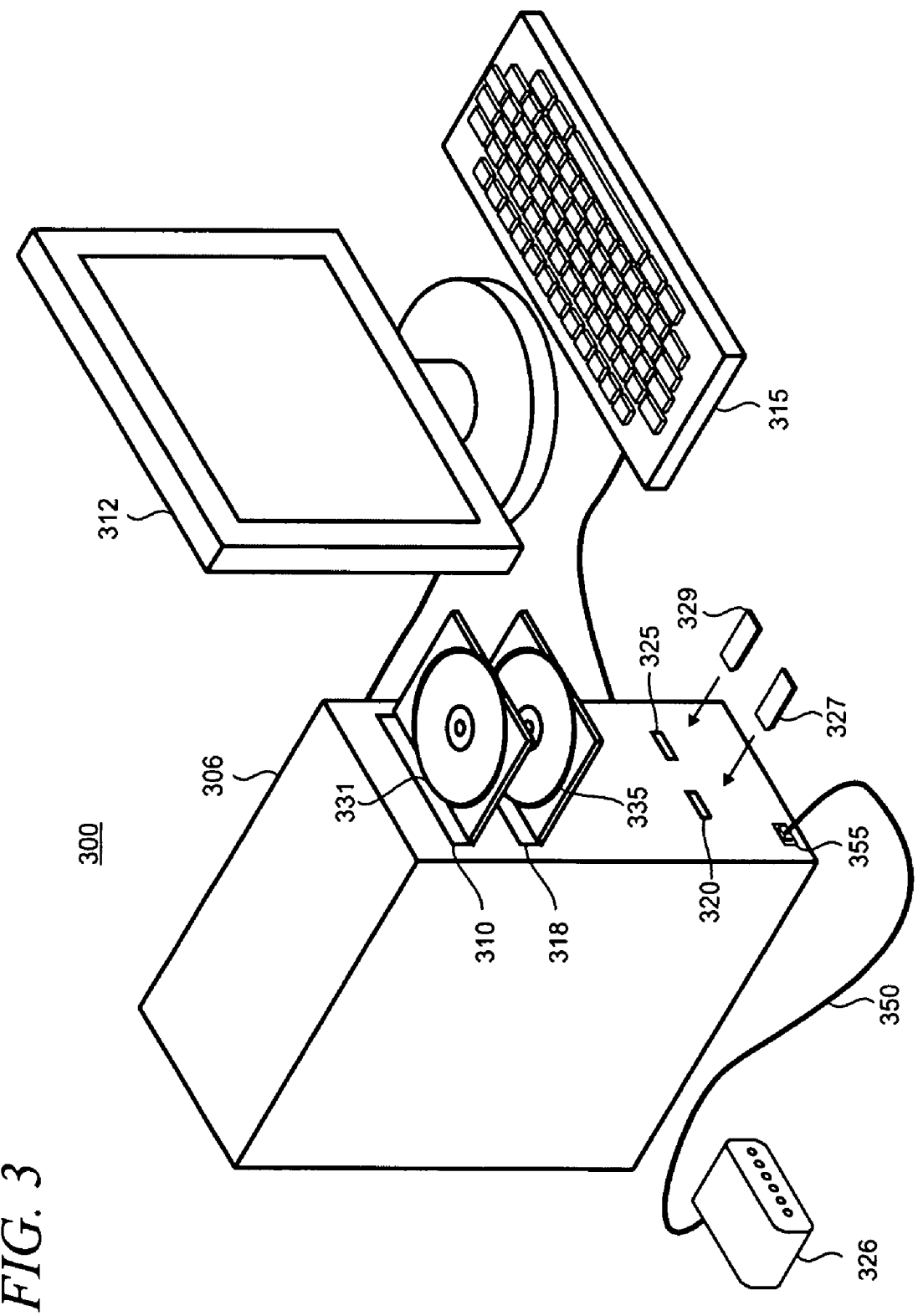
FIG. 3 is a pictorial view of an illustrative arrangement for enabling the reordering of media content using a dual drive tower-type media server with monitor, keyboard, and network gateway.

FIG. 3 is a pictorial view of an illustrative arrangement 300 for enabling the reordering of media content using a dual drive tower-type media server 306 with monitor 312, keyboard 315 and network gateway 326.

Media server 306 is equipped with dual optical drives 310 and 318 which are configured with similar features and functionalities as drives 110 and 118 shown in FIG. 1 and described in the accompanying text. Source and target drives 310 and 318 hold custody of source and target media 331 and 335 (which are shown in the drive trays in their extended positions). Source and target media 331 and 335 are arranged in a similar manner as media 131 and 135 in FIG. 1.

Media server 306, in this illustrative example, is further configured with dual removable media drives 320 and 325. Removable media drives 320 and 325 are arranged with similar features and functionalities as those shown in FIG. 2 and described in the accompanying text. Removable media drives 320 and 325 are configured to read from and write to removable media 327 and 329 which are similar to the removable media shown in FIG. 2.

Monitor 312 and keyboard 315 provide a user interface to the media server 306. The user interface enables a user to select media files from the source medium 331 or removable medium 327 that are copied to respective target media as well as the play order of the copied media files, as described in more detail below.

Media server 306 is coupled to network gateway 326 using cable 350 (e.g., an Ethernet-type cable), which is coupled to network port 355 on media server 306. Network gateway 326 provides a connection to external networks and resources to media server 306 such as online media sources on the Internet.

Figure 4:
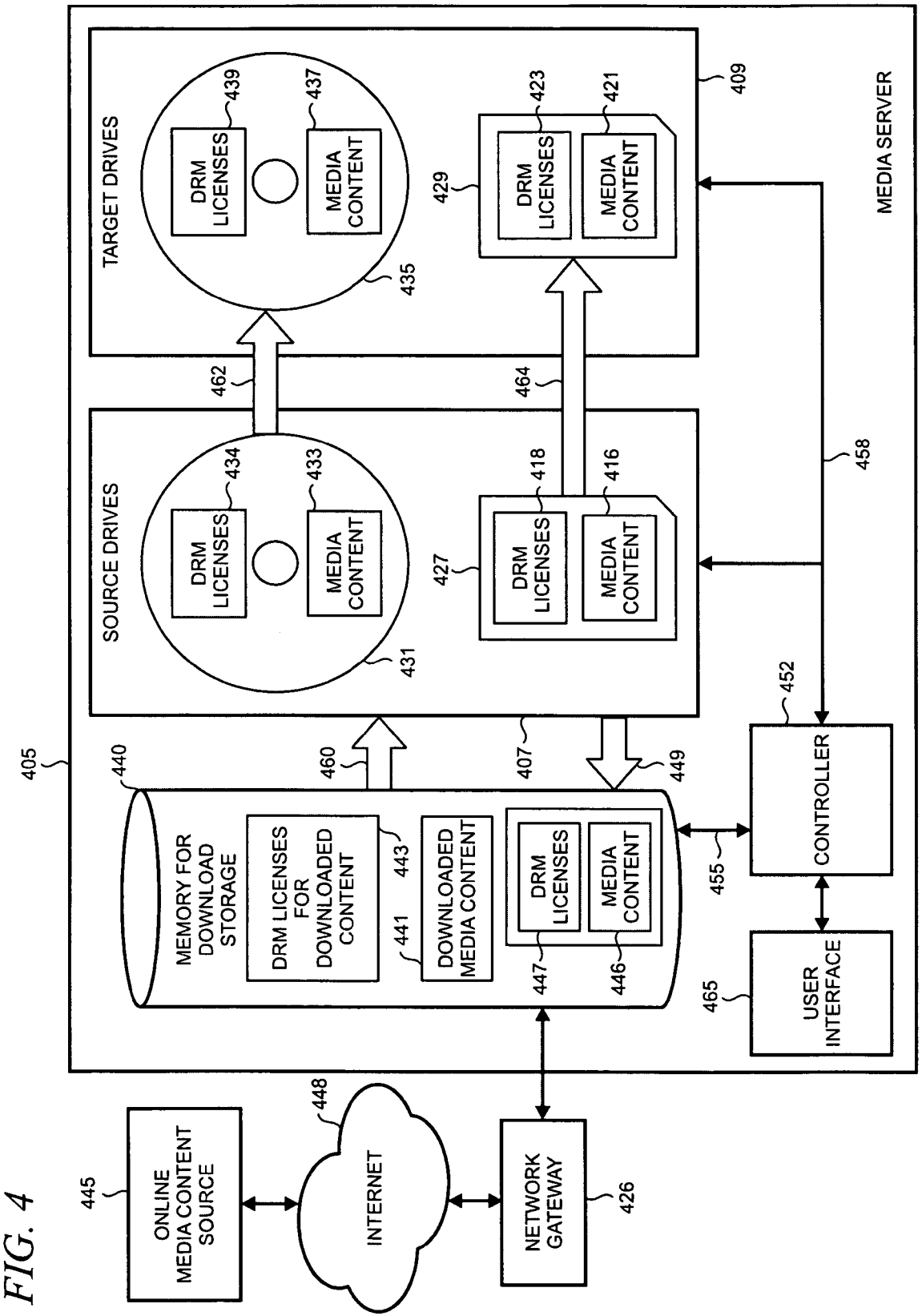
FIG. 4 is a functional block diagram of an illustrative media server.

FIG. 4 is a functional block diagram of an illustrative media server 405. Media server 405 may be arranged, depending on the requirements of an application, with one of the forms shown in FIGS. 1, 2 and 3. Media server 405, in this illustrative arrangement, is configured with two sets of dual drives including sources drives 407 and target drives 409. Source drives 407 include an optical drive which holds custody of an optical source medium 431. Source drives 407 also include a removable media drive which holds custody of a removable source medium 427. Target drives 409 include an optical drive which holds custody of an optical target medium 435. Target drives 409 also include a removable media drive which holds custody of a removable target medium 429. Optical media 431 and 435 are similar in form and function to optical media 131 and 135 shown in FIG. 1 and described in the accompanying text. Removable media 427 and 429 are similar in form and function to the removable media 227 and 229 shown in FIG. 2 and described in the accompanying text.

Media server 405 includes a memory, such as a hard disk drive 440, for storing downloaded media content 441 which is protected by associated DRM licenses 443. Media content 441 is typically downloaded from an online media content source 445, such as an online music store, over the Internet 448 which is coupled to media server 405 using network gateway 426.

A controller 452 is operatively coupled to hard disk drive 440 on bus 455 to enable control over downloaded media content 441 when copied or transferred (as indicated by arrow 460) to either or both optical source medium 431 or removable source medium 427 using source drives 407. Controller 452 is further operatively coupled to source drives 407 and target drives 409 over bus 458. In accordance with the present DRM arrangement, downloaded media content 441 is copied along with its associated DRM licenses 443 to the optical source medium 431 and/or removable source medium 427.

The copied media content and associated DRM license are shown as being stored on optical source medium 431 by reference numerals 433 and 434, respectively. Likewise, removable source medium 427 contains copied media content 416 and associated DRM license 418. In alternative arrangements, media content is written on optical source medium 431 or removable source medium 427 as a means of original distribution of such content. That is, optical source medium 431 or removable source media 427 are used as retail-ready media content packages.

A user interface 465 is operatively coupled to controller 452. User interface is configured, in alternative arrangements, as shown in FIG. 2 or 3, using a display and input device. User interface 465 enables a user to select media files from the source medium 431 or removable medium 427 that are copied to respective target media contained in the target drives 409. User interface 465 further enables a user to select the play order of the copied media files on the target media.

The target drives 409 write the selected media files and associated DRM licenses in the order selected by the user on to the target media to effectuate the copying (as indicated by arrows 462 and 464). As a result of the writing operation, the optical target medium 435 will include the copied media content 437 and the associated DRM licenses 439, as shown. Similarly, the removable target medium 429 will include the copied media content 421 and associated DRM licenses 423.

In some applications of the present arrangement, the hard disk drive 440 may be arranged as a target medium and receive media content 446 and associated DRM licenses 447 that are copied from source drives 407 as indicated by arrow 449.

The copying process implemented by the target drives in the media server 405 is arranged to ensure that the DRM licenses are locked to a particular instance of a target media. Each discrete example of a particular target media type (for example, Blu-ray optical disc) may be configured to include an ID, code, key or serial number that uniquely identifies it. Such unique identification may comprise, for example, a number sequence or an alphanumeric expression. In addition, the unique identification is permanent because it is not capable of being modified.

Use of the unique identification feature enables, for example, the media content to be copied onto the target medium using an encoding/encryption methodology that uses the serial number as a key or seed, or as a component of such key or seed. The serial number is subsequently read from the disk and used by a media player's resident DRM system to decode or de-encrypt and render the content. Thus the use of the unique and non-modifiable disk identification ensures that the copied DRM license is bound to a specific piece of target medium. Similar techniques to bind the DRM to a specific piece of target medium may also be implemented with other media types including storage devices such as hard disk drives and flash memory.

While several alternative arrangements are shown in FIGS. 1-4 that may be used to rearrange media content while preserving DRM protection, other arrangements are also contemplated. In particular, the features and functionalities provided by media server 405 and described in the text accompanying FIG. 4 may be added or incorporated into a variety of currently available electronic devices. For example, jukeboxes, media servers, media center PCs (personal computers), CD players, DVD players, PCs, laptop computers, tablet PCs, game consoles (e.g., those sold under the Sony PlayStation®, Microsoft Xbox®, and Nintendo GameCube® brands to mention just a few popular game systems), television set top boxes, and combinations thereof, may be arranged to implement the present content rearranging with preservation of DRM protection.

Figure 5:
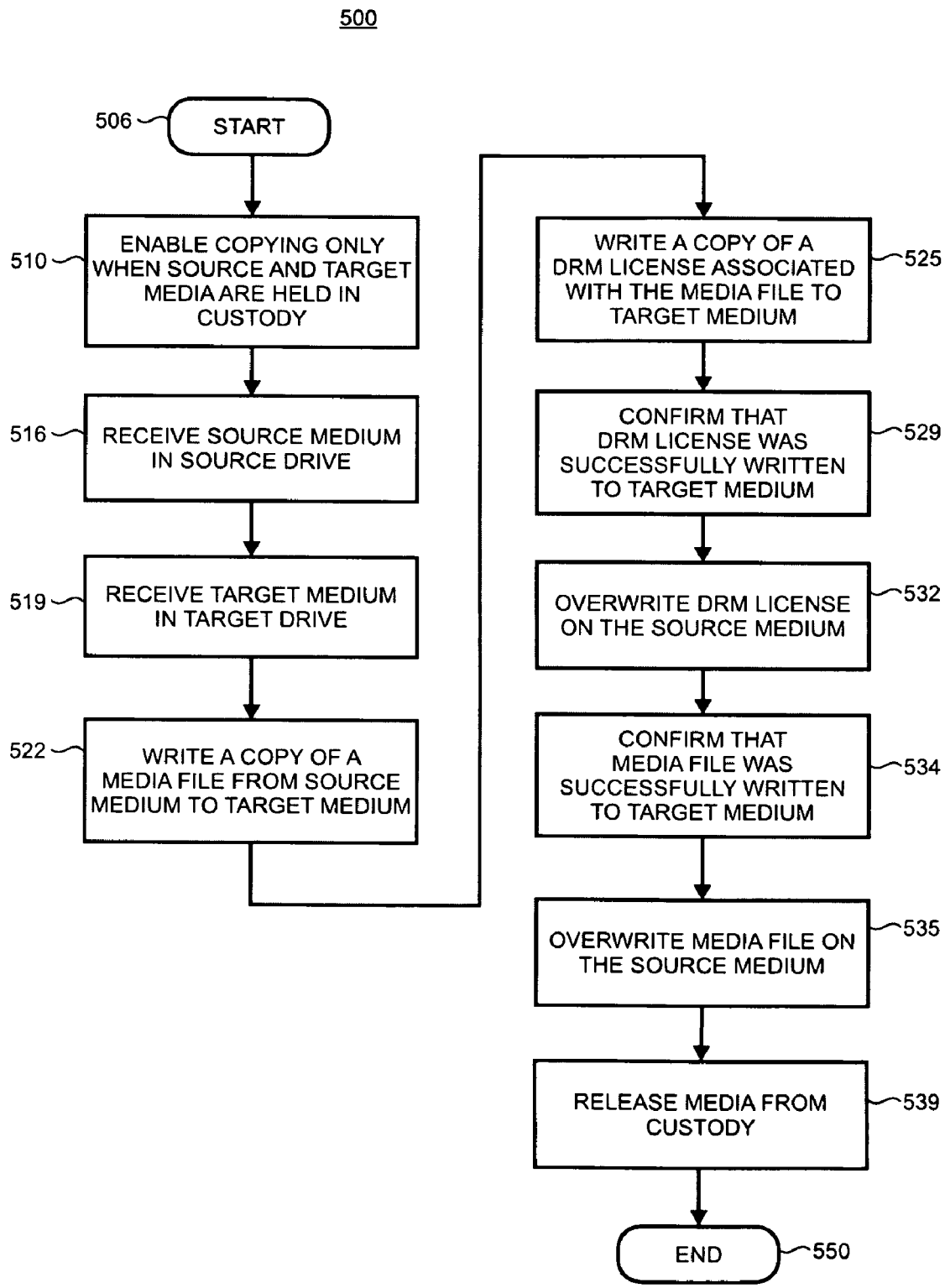
FIG. 5 is a flowchart of an illustrative method for controlling copying of a media file.

FIG. 5 is a flowchart of an illustrative method 500 for controlling copying of a media file. Such illustrative method is performed, for example, by the jukeboxes and media server shown in FIGS. 1-4 above. It is emphasized that the sequence of steps in the illustrative method 500 may be varied in order from that shown in FIG. 5 according the requirements of a specific application. In addition, the processes performed at each step do not necessarily need to be applied to an entire media file at one time. For example, the processes of reading, copying and overwriting described below may be performed on just a portion of a media file and/or DRM license at a time so that the media file as a whole is copied using an iterative process. As the portion size gets smaller and the number of iterations increase, the process of writing the copy to the target medium and erasing the source may become essentially monolithic. Such monolithic process may advantageously prevent circumvention of DRM protection because a complete (i.e., whole) DRM license is never held on both the source and target media at the same time. And, as noted below in the text accompanying block 539, additional circumvention measures are provided as the target medium typically will not be released from the custody of the jukebox or media server until the DRM license on the source medium is completely erased.

The method starts at block 506. At block 510, in accordance with the present DRM arrangement, copying of media files contained on a source medium is enabled only when the source medium and a target medium are held in custody of a media server. In this way, copying can be controlled to ensure that DRM protection is locked to the target medium, and further, that the source medium is overwritten to prevent proliferation of copies of the media files.

At blocks 516 and 519, source and target media are received in respective source and target drives. As described above, such source and target media are implemented using rewritable media such as optical storage media or removable storage media. At block 522, once a media file is read from the source media, it is written to the target media. In most applications, the media file is copied exactly. However, in alternative applications, the media file is copied in a way which makes changes to the copied file. For example, the media file may be compressed using a lossy encoding methodology such as MP3, or otherwise reduced in quality or resolution.

The DRM license associated with the copied media file is read from the source medium, regenerated for the target medium and then written to the target medium at block 525 in FIG. 5. As noted above, the unique identifier such as a disc serial number is preferably used during the copying process to ensure that the DRM license is bound and locked to the target medium. Such regeneration is typically performed to create a new DRM license that is applicable to the copied media files which may differ from the originals (e.g., in playback order, compression, etc.). In alternative applications, the DRM license is written so as to be identical to the DRM license contained on the source medium.

At block 529, confirmation is made that the DRM license was successfully written to the target medium. Such confirmation typically includes verifying that the DRM license as written is readable without errors. At block 532, after the confirming step is completed, the DRM license on the source medium is overwritten. Overwriting is a process where every bit position on the source medium occupied by a file is written over with an arbitrary pattern of 1s and 0s or with other "junk" data. Such process ensures that the data is unrecoverable. In some applications, the data is overwritten more than once to compensate, for example, for variations in alignment between the drive head or pickup and the storage media, wobble in the drive (in the case of optical drives) and other factors.

The media file on the source medium is also overwritten at block 535 after confirming that the media file was successfully written to the target medium at block 534. In some applications, the overwriting of the media file is an optional process in cases when the DRM license is sufficiently strong such that its loss (through overwriting) disables possible reuse of the media file on the source medium.

Upon completion of the overwriting of the DRM license and media file on the source medium, then, as shown at block 539, the source and target media are released from the custody of the media server. At a minimum, the target medium will not be released from the media server until the DRM license on the source medium is completely destroyed through the overwriting process. However, in most applications the media server and controller hardware contained therein (e.g., controller 452 in FIG. 4) are arranged to prevent removal of either the source or target media from the media server during the copying process. Prevention of media release is implemented to ensure the integrity of the copying process and to preclude intentional or accidental circumvention of the DRM protection as the copy is made. For example, if power is cut (intentionally or otherwise) to the media server during the copying process, the media server is configured to resume or reinitiate the copying process prior to releasing the source and target media from custody immediately upon restoration of power.

In addition, the process of writing, confirming, and overwriting (in blocks 522-535) may be optionally performed on a partial file basis. Here, a portion of a media file (e.g., a group of sectors on a CD or DVD) is read from the source medium, copied to the target medium, and overwritten before the next portion is handled using an iterative process. In this way, the potential for intentional DRM circumvention is minimized.

The method ends at block 550.

Figure 6:
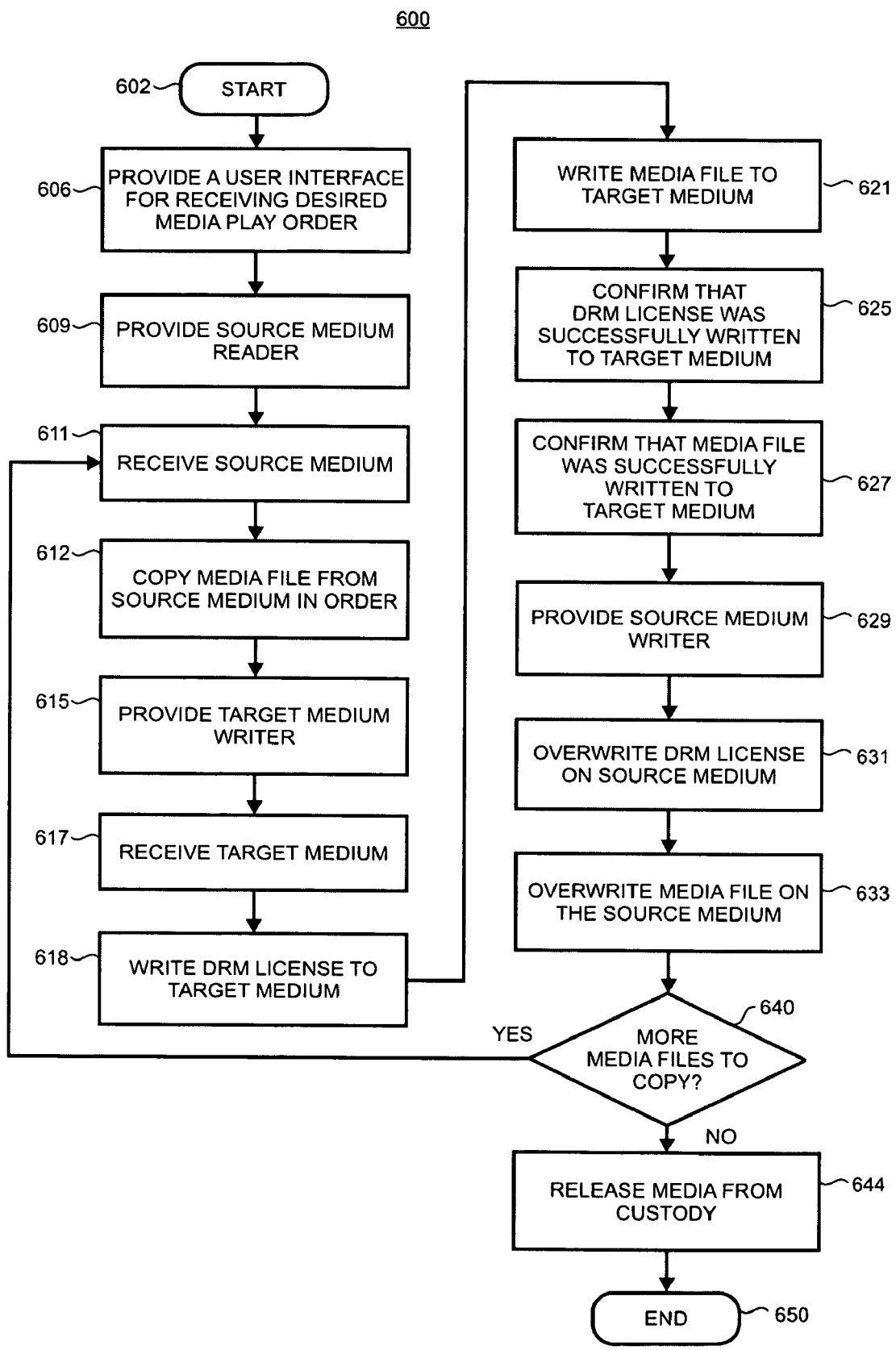
FIG. 6 is a flowchart of an illustrative method for setting the play order of media files.

FIG. 6 is a flowchart of an illustrative method 600 for rearranging the play order of media files. The method begins at block 602. At block 606 a user interface is provided to a user to facilitate the selection of media files from a source medium as well as setting the play order of the selected media files that are copied to a target medium. Such a user interface is implemented using a display and user input device (knobs, buttons, remote control etc.) such as that shown in FIG. 2. Alternatively, a monitor and keyboard coupled to the media server as shown in FIG. 3 is employed to provide the user interface.

At block 609, a source medium reader is provided to read media files and associated DRM licenses from a source medium such as an optical disc or removable flash-type memory card. In many applications, the source medium reader is combined with a source medium writer in a single combination drive, such as an optical read/write drive.

At block 611, a source medium is received in the source drive. At block 612, media files are read from the source medium and copied according to the order selected by the user. In alternative implementations, it may be desirable to read the media files in an arbitrary order into a buffer or other memory. In this case the desired play order is established when the media files are written to the target medium.

At block 615, a target medium writer is provided to write the media file and associated DRM licenses to the target medium as indicated in blocks 618 and 621. The target medium writer is typically arranged from an optical drive or removable media drive. At block 617, a target medium is received in the target drive.

At blocks 625 and 627, the successful writing of the DRM license and media file to the target medium is checked and confirmed. As noted above, such confirmation generally includes verifying that the written files are readable without error.

At block 629, a source medium writer is provided. As noted above in the text accompanying block 609, in many applications the source medium writer is combined with the source medium reader in a single combination device. At blocks 631 and 633, respectively, the DRM license and media files are overwritten on the source medium. As with the method shown in FIG. 5 and described in the accompanying text, in some applications the overwriting of media files is an optional process.

At decision block 640 in FIG. 6, the method described above is repeated from block 611, as indicated, until all the media files selected by the user in block 606 are written on to the target medium in the selected order. At block 611, a different source medium may be received in the source drive so as to enable media files to be copied from a plurality of source media. For example, a media file is copied from optical disc A on a first loop through the flowchart (i.e., through blocks 611 to 640, while on the second loop a media file is copied from optical disc B. Similarly, different target media (e.g., optical discs C and D) may be inserted into the target drive at block 617 in the flowchart to enable media files to be copied in a selected order to a plurality of target media.

After all the media files are copied in the selected order with the associated DRM licenses, and the original files overwritten on the source medium, then, as indicated by block 644, the source and target media are physically released from the custody of the source and target drives. The user is then free to remove the source and target media from the respective drives. The target medium includes media files in the play order selected by the user with the DRM protection intact and locked to the target medium. The method ends at block 650.

What has been described above includes illustrative examples of the present rearrangement of media content while preserving digital rights management protection. It is, of course, not possible to describe every conceivable combination of components or methodologies, but one of ordinary skill in the art may recognize that many further combinations and permutations are possible. Accordingly, the illustrative examples are intended to embrace all such alterations, modifications, and variations that fall within the spirit and scope of the appended claims.

In particular and in regard to the various functions performed by the above described methods, components, devices, circuits, systems, and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the illustrative examples provided herein. In this regard, it will also be recognized that the illustrative examples include a system as well as a computer-readable medium having computer-executable instructions for performing the acts and/or events of the various methods.

In addition, while a particular feature of the illustrative examples may have been disclosed with respect to only one of several implementations, such feature may be combined with one or more other features of the other implementations as may be desired and advantageous for any given or particular application or setting. Furthermore, to the extent that the terms "includes" and "including" and variants thereof are used in either the detailed description or the claims, these terms are intended to be inclusive in a manner similar to the term "comprising."

Other features of the invention are contained in the claims that follow.

What is claimed is:

1. A method for controlling copying of a media file having an associated DRM license, the method comprising the steps of:
enabling copying of a media file stored on one or more source media to a target medium only when both the one or more source media and the target medium are held in custody by a media server;
writing a copy of at least a portion of the media file to the target medium;
writing a copy of only a portion of the DRM license on the one or more source media to the target medium;
confirming that the copy of the portion of the DRM license was successfully written to the target medium; and
overwriting the portion of the DRM license on the one or more source media after the step of confirming.

2. The method of claim 1 in which the media file is downloaded from an online media source prior to being stored on the one or more source media.

3. The method of claim 1 in which the one or more source media are selected from one of hard disk, CD, CD-R, CD-RW, DVD, high definition DVD, HD-DVD, Blu-ray, Enhanced Versatile Disc, Holographic Versatile Disc, Versatile Multilayer disc, Forward Versatile Disc, Digital Multilayer Disc, DVD-R, DVD+R, DVD-RW, DVD+RW, DVD-RAM, Memory Stick, Compact Flash, Secure Digital, Micro Drive, Smart Media or Multi-Media Card.

4. The method of claim 1 in which the target medium is selected from one of hard disk, CD, CD-R, CD-RW, DVD, HD-DVD, Blu-ray, Enhanced Versatile Disc, Holographic Versatile Disc, Versatile Multilayer disc, Forward Versatile Disc, Digital Multilayer Disc, DVD-R, DVD+R, DVD-RW, DVD+RW, DVD-RAM, Memory Stick, Compact Flash, Secure Digital, Micro Drive, Smart Media or Multi-Media Card.

5. The method of claim 1 in which the media server is selected from one of jukebox, PC, laptop computer, tablet PC, CD player, CD recorder, DVD player, DVD recorder, set top box, game console, digital video recorder, personal video recorder, music player, video player, media player or MP3 player.

6. The method of claim 1 further including a step of overwriting the media file on the one or more source media after the step of confirming and prior to releasing the source medium from custody of the media server.

7. The method of claim 1 further including a step of copying a plurality of media files from the one or more source media to the target medium.

8. The method of claim 1 in which the copying of the least a portion of the DRM license to the target medium includes creating a new DRM license key on the target medium using an identifier that uniquely identities the target medium to thereby bind the copied DRM license to the target medium.

9. The method of claim 7 in which the plurality of media files on the one or more source media are arranged in a first order and the copying to the target medium arranges the copied media files in a different order from the first order, said different order comprising an order determined by a user.

10. The method of claim 7 in which the copying of the plurality of media files onto the target medium includes encrypting the plurality of media files using a new DRM license key that is created by using an identifier that uniquely identifies the target medium to thereby bind the copied DRM license to the target medium.

11. The method of claim 7 in which the copying of the plurality of media files onto the target medium includes encrypting the plurality of media files using an identifier that uniquely identifies the target medium to thereby bind the copied plurality of media files to the target medium.

12. The method of claim 8 in which the identifier is one of serial number, identification number or identification key.

13. The method of claim 11 in which the identifier is one of serial number, identification number or identification key.

14. A media server for holding a source medium in custody and for copying DRM-protected media content from the source medium to a target medium while preserving DRM protection, comprising:
a source medium reader for reading the media content and a DRM license from the source medium;
a source medium writer for overwriting the media content on the source medium;
a target medium writer for writing a copy of the media content and the DRM license to the target medium; and
a controller to coordinate writing by the source medium writer and the target medium writer to prevent the DRM license from simultaneously existing as a whole on both the source medium and target medium,
wherein said controller coordinates writing by writing a copy of only a portion of the DRM license to the target medium, confirming that the copy of the portion of the DRM license was successfully written to the target medium; and overwriting only the portion of the DRM license on the one or more source media after the step of confirming.

15. The media server of claim 14 in which the source medium reader and source medium writer are combined into a single read/write device.

16. The media server of claim 14 in which the controller instructs the source medium writer to overwrite the medium content on the source medium on a file by file basis.

17. The media server of claim 15 in which the single read/write device is a hybrid optical drive.

18. A method for arranging media riles, each media file having an associated DRM license and written on at least one source medium, the method comprising the steps of:
    providing a user interface arranged to receive user input that is indicative of a user-selected media file arrangement;
    providing a target medium writer for holding the target medium in custody while writing a copy of only a portion of a DRM license to a target medium responsively to the received user input;
    providing a source medium writer for holding the at least one source medium in custody, the source medium writer arranged for overwriting the portion of the DRM license on the at least one source medium upon confirmation that a copy of only the portion of the DRM license was written to the target medium by the target medium writer; and
    enabling release of the at least one source medium from custody of the source medium writer only when the portion of the DRM licensing on the source medium is overwritten.

19. The method of claim 18 in which the target medium writer writes a copy of a portion of a media file corresponding to a written copy of the portion of DRM licensing to thereby lock a copy of the portion of the media file and a copy of the portion of DRM licensing to the target medium.

20. The method of claim 18 in which the user interface, target medium writer, and source medium writer are disposed in a media server.

21. The method of claim 18 in which user interface includes a display and an input device for enabling a user to set a media file order for the media files written on the target medium.

22. The method of claim 18 further including a step of enabling media files from a plurality of source media to be written on to a single target medium.

23. The method of claim 18 in which the media files are selected from one of video, music and games.

24. The method of claim 19 in which the lock is enabled by using an identifier such as a serial number associated with the target medium to encrypt the portion of the DRM license.

25. The method of claim 19 in which the lock is enabled by using an identifier such as a serial number associated with the target medium to encrypt the portion of the media file.

26. The method of claim 21 in which the media file order comprises a playing order for music files.

27. The method of claim 21 in which the input device is selected from one of keyboard or remote control.

* * * * *